(12) United States Patent
Gajiwala et al.

(10) Patent No.: US 10,072,613 B2
(45) Date of Patent: Sep. 11, 2018

(54) METHODS OF FORMING FLEXIBLE STRUCTURES FOR A ROCKET MOTOR ASSEMBLY, RELATED FLEXIBLE STRUCTURES, AND RELATED ASSEMBLIES INCLUDING THE FLEXIBLE STRUCTURES

(71) Applicant: ORBITAL ATK, INC., Minneapolis, MN (US)

(72) Inventors: Himansu M. Gajiwala, Layton, UT (US); Steven B. Hall, Perry, UT (US)

(73) Assignee: ORBITAL ATK, INC., Plymouth, MN (US)

( * ) Notice: Subject to any disclaimer, the term of this patent is extended or adjusted under 35 U.S.C. 154(b) by 640 days.

(21) Appl. No.: 14/629,297

(22) Filed: Feb. 23, 2015

(65) Prior Publication Data

US 2016/0245233 A1    Aug. 25, 2016

(51) Int. Cl.
*F02K 9/84* (2006.01)
*B32B 27/08* (2006.01)
(Continued)

(52) U.S. Cl.
CPC ............... *F02K 9/84* (2013.01); *B32B 3/266* (2013.01); *B32B 7/02* (2013.01); *B32B 25/20* (2013.01); *B32B 27/08* (2013.01); *B32B 27/283* (2013.01); *C08G 77/04* (2013.01); *C08G 77/12* (2013.01); *C08G 77/20* (2013.01); *C08L 83/04* (2013.01); *C08L 83/06* (2013.01); *C09J 183/04* (2013.01); *C09J 183/06* (2013.01); *B32B 2250/00* (2013.01); *B32B 2250/02* (2013.01);
(Continued)

(58) Field of Classification Search
CPC ...... F02K 9/84; F02K 9/88; F02K 9/97–9/978
See application file for complete search history.

(56) References Cited

U.S. PATENT DOCUMENTS 3,086,359 A    4/1963   Davis
3,373,633 A    3/1968   Desmond et al.
(Continued)

FOREIGN PATENT DOCUMENTS

DE     3346452 C1     12/2003
JP     S49-085798     8/1974
(Continued)

OTHER PUBLICATIONS

Japanese Office Action for Japanese Patent Application No. 2016-031593 dated Feb. 3, 2017, 2 pages.
(Continued)

*Primary Examiner* — Arun Goyal
(74) *Attorney, Agent, or Firm* — TraskBritt

(57) ABSTRACT

A method of forming a flexible structure for a rocket motor assembly comprises forming a polysiloxane composition comprising at least two different silicone materials. A preliminary structure is formed from the polysiloxane composition. The preliminary structure is cured to crosslink at least a portion of different polysiloxane chains of the preliminary structure. A flexible structure for a rocket motor assembly, a flexible assembly for a rocket motor assembly, a moveable thrust nozzle assembly for a rocket motor assembly, and a rocket motor assembly are also described.

16 Claims, 9 Drawing Sheets

(51) Int. Cl.
   *B32B 27/28* (2006.01)
   *C08G 77/04* (2006.01)
   *C08G 77/12* (2006.01)
   *C08G 77/20* (2006.01)
   *C09J 183/04* (2006.01)
   *C09J 183/06* (2006.01)
   *C08L 83/04* (2006.01)
   *C08L 83/06* (2006.01)
   *B32B 3/26* (2006.01)
   *B32B 7/02* (2006.01)
   *B32B 25/20* (2006.01)

(52) U.S. Cl.
   CPC ..... *B32B 2250/24* (2013.01); *B32B 2307/306* (2013.01); *B32B 2307/3065* (2013.01); *B32B 2307/50* (2013.01); *B32B 2307/542* (2013.01); *B32B 2307/546* (2013.01); *B32B 2605/00* (2013.01); *B32B 2605/18* (2013.01); *C08L 2205/025* (2013.01)

(56) References Cited

U.S. PATENT DOCUMENTS

| | | | |
|---|---|---|---|
| 3,860,134 A * | 1/1975 | Kobalter | F02K 9/84 239/265.43 |
| 4,355,663 A | 10/1982 | Burkes, Jr. et al. | |
| 4,936,092 A | 6/1990 | Andrew | |
| 4,964,339 A | 10/1990 | Bastian et al. | |
| 5,060,550 A | 10/1991 | Hoever et al. | |
| 5,070,691 A | 12/1991 | Smith et al. | |
| 5,271,678 A | 12/1993 | Bourgeot | |
| 5,511,745 A | 4/1996 | Faupell et al. | |
| 5,784,877 A | 7/1998 | Hewitt | |
| 6,013,711 A | 1/2000 | Lewis et al. | |
| 6,020,424 A | 2/2000 | Osuna et al. | |
| 6,481,198 B1 | 11/2002 | Hepler et al. | |
| 8,276,361 B2 | 10/2012 | Garbe | |
| 8,919,254 B2 | 12/2014 | Diehl et al. | |
| 2010/0086760 A1 | 4/2010 | Zhu | |
| 2012/0065294 A1 | 3/2012 | Gajiwala et al. | |

FOREIGN PATENT DOCUMENTS

| | | |
|---|---|---|
| JP | 07331079 A | 12/1995 |
| JP | H07-331079 | 12/1995 |
| JP | 2002012766 A | 1/2002 |
| JP | 2013082907 A | 5/2013 |
| JP | 2013164046 A | 8/2013 |

OTHER PUBLICATIONS

Extended European Search Report and Opinion on European Patent Application No. EP16 15 4021, dated Jul. 5, 2016; 8 pages.
Communication pursuant to Rules 70(2) and 70a(2) EPC of the European Patent Office for European Patent Application 16154021.6, dated Aug. 29, 2016, 2 pages.
Wacker Silicones Material Safety Data Sheet for ELASTOSIL® R 401/10, Ver. 1.4, Jan. 15, 2015, eight (8) pages.
Wacker Silicones Material Safety Data Sheet for ELASTOSIL® R 401/20, Ver. 1.2, Jan. 15, 2015, nine (9) pages.
Wacker Silicones Technical Data Sheet for ELASTOSIL® R 401/10, "Low Durometer High Consistency Silicone Rubber," Ver. 1.8, Oct. 11, 2014, two (2) pages.
Wacker Silicones Technical Data Sheet for ELASTOSIL® R 401/20, "High Consistency Silicone Rubber," Ver. 1.7, Jun. 11, 2014, two (2) pages.

* cited by examiner

METHODS OF FORMING FLEXIBLE STRUCTURES FOR A ROCKET MOTOR ASSEMBLY, RELATED FLEXIBLE STRUCTURES, AND RELATED ASSEMBLIES INCLUDING THE FLEXIBLE STRUCTURES

FIELD

Embodiments of the disclosure relate generally to methods of forming flexible structures, and to related flexible structures, and flexible assemblies including the flexible structures. More particularly, embodiments of the disclosure relate to methods of flexible structures from at least two different silicone materials, and to related flexible structures, flexible assemblies, moveable thrust nozzle assemblies, and rocket motor assemblies.

BACKGROUND

Rocket motor assemblies generally include at least one containment vessel (e.g., housing) having at least one propellant structure (e.g., a solid propellant grain) therein, and at least one thrust nozzle operatively associated with the containment vessel. Multi-stage rocket motor assemblies may, for example, include an outer housing holding a plurality of stages each including a containment vessel holding a propellant structure therein, and a thrust nozzle operatively associated with the containment vessel. The outer housing may be separable such that when a propellant structure of a given stage has been consumed, that stage may be separated from the other stages to remove excess weight and, hence, increase the range and/or the speed of the multi-stage rocket motor assembly. An adjoining stage may then be fired immediately, or at a desired later time during the flight of the multi-stage rocket motor assembly.

Rocket motor assemblies can also include flexible bearing assemblies operatively associated with the thrust nozzles thereof. Each stage of a multi-stage rocket motor assembly may, for example, include a different flexible bearing assembly operatively associated with the thrust nozzle thereof. A flexible bearing assembly may include a lamination of alternating flexible seals and rigid shims that are stacked and bonded together. The lamination may be laterally flexible, that is, in directions parallel to the flexible seals, but unyielding in the directions perpendicular to the flexible seals. Lateral movement of the flexible bearing assembly (e.g., by way of at least one actuator) may be used to modify the orientation of the thrust nozzle operatively associated therewith, so as to control the direction of the rocket motor assembly during use and operation (e.g., flight) of the rocket motor assembly.

Unfortunately, the material compositions and properties of conventional flexible seals for flexible bearing assemblies can impose undesirable limitations on production efficiency, and on at least one of the capabilities, performance, durability, and reliability of the flexible bearing assemblies (and, hence, on rocket motor assemblies including the flexible bearing assemblies). For example, conventional flexible seals formed from natural rubber (NR) based formulations or polyisoprene (PI) rubber-based formulations may have significant production costs associated with the large number of ingredients beyond NR and PI (e.g., additives, such as fillers, antioxidants, tackifiers, processing aids, plasticizers, activations, curatives, etc.) typically required to achieve desirable properties, and can also have low strength, be prone to significant cavitation and loading damage, exhibit poor low temperature capabilities, and exhibit poor aging characteristics. As another example, conventional flexible seals formed from silicone rubber formulations including a single, preselected grade of silicone rubber can only be used for a very limited number of rocket motor assembly types due to the unsuitability of various material properties (e.g., Shore A hardness, shear modulus, etc.) provided by the selected grade of silicone rubber relative to the various needs (e.g., various loading needs, various torquing needs, etc.) of other, different rocket motor assemblies.

Accordingly, there is a continuing need for flexible structures (e.g., flexible seals) having material compositions and properties capable of meeting the needs of a wide variety of rocket motor assemblies, as well as for methods of forming such flexible structures. It would also be desirable to have new assemblies (e.g., flexible assemblies, moveable thrust nozzle assemblies, rocket motor assemblies, etc.) including such flexible structures.

BRIEF SUMMARY

In accordance with one embodiment described herein, a method of forming a flexible structure for a rocket motor assembly comprises forming a polysiloxane composition comprising at least two different silicone materials. A preliminary structure is formed from the polysiloxane composition. The preliminary structure is cured to crosslink at least a portion of different polysiloxane chains of the preliminary structure.

In additional embodiments, a flexible structure for a rocket motor assembly comprises a shaped, cured polysiloxane composition comprising crosslinked polysiloxane chains of at least two different silicone materials.

In further embodiments, a flexible assembly for a rocket motor assembly comprises a first substrate, a second substrate overlying the first substrate, and a lamination comprising an alternating sequence of flexible structures and rigid structures extending between the first substrate and the second substrate. At least one of the flexible structures comprises a cured polysiloxane composition comprising crosslinked polysiloxane chains of at least two different silicone materials.

In yet further embodiments, a moveable thrust nozzle assembly for a rocket motor assembly comprises a fixed housing and at least one flexible assembly coupled to and circumscribing a portion of the fixed housing. The at least one flexible assembly comprises an end-ring and a lamination comprising an alternating sequence of flexible structures and rigid structures extending between the fixed housing and the end-ring. At least one of the flexible structures comprises a cured polysiloxane composition comprising crosslinked polysiloxane chains of at least two different silicone materials.

In yet still further embodiments, a rocket motor assembly comprises at least one stage comprising a vessel containing a propellant structure and a moveable thrust nozzle assembly connected to an end of the vessel. The moveable thrust nozzle assembly comprises a fixed housing and a flexible assembly coupled to and circumscribing a portion of the fixed housing. The flexible assembly comprises an end-ring and a lamination comprising an alternating sequence of flexible structures and rigid structures extending between the fixed housing and the end-ring. At least one of the flexible structures comprises a cured polysiloxane composition comprising crosslinked polysiloxane chains of at least two different silicone materials.

DETAILED DESCRIPTION

Figure 1:
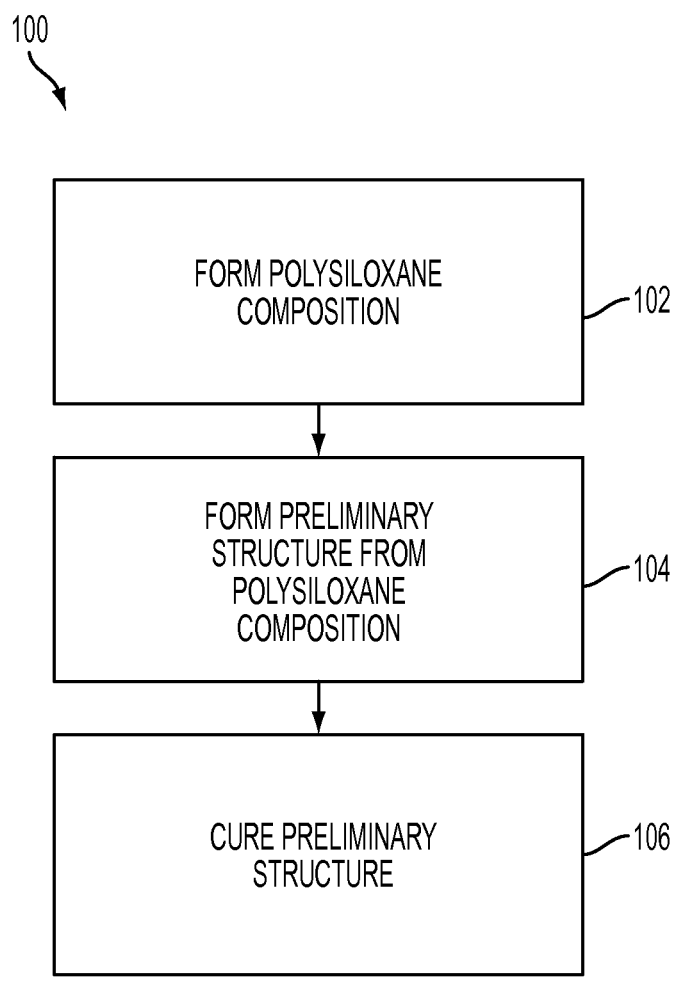
FIG. 1 is a is a simplified flow diagram a method of forming a flexible structure, in accordance with an embodiment of the disclosure.

Methods of forming a flexible structure, such as a flexible structure for a rocket motor assembly, are described, as are related flexible structures, and flexible assemblies (e.g., flexible bearing assemblies, moveable thrust nozzle assemblies, rocket motor assemblies, etc.) including the flexible structures. In some embodiments, a method of forming a flexible structure for an aerospace application comprises forming a polysiloxane composition formed of and including at least two different silicone materials and, optionally, at least one additive (e.g., a crosslinking/curing agent). The polysiloxane composition may be formed (e.g., molded, extruded, etc.) into a preliminary structure, and then the preliminary structure may be cured to crosslink polysiloxane chains of the different silicone materials and form the flexible structure. The types and amounts of the different silicone materials and additive(s) (if any) of the polysiloxane composition may be selected relative to each other to at least provide the polysiloxane composition a different Shore A hardness than the Shore A hardness of each of the different silicone materials alone, as well as to at least provide the subsequently formed flexible structure a desired shear modulus. The flexible structures of the disclosure may exhibit material properties more favorable to the use of the flexible structures in a wide variety of assemblies (e.g., rocket motor assemblies) for aerospace applications than material properties of conventional flexible structures. Structures and assemblies formed in accordance with the methods of the disclosure may exhibit enhanced capabilities, performance, durability, and reliability as compared to corresponding conventional structures and assemblies formed through conventional methods.

The following description provides specific details, such as material types, material thicknesses, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow for manufacturing a structure or assembly. The structures described below do not form a complete assembly. Only those process acts and structures necessary to understand the embodiments of the disclosure are described in detail below. Additional acts to form the complete assembly from various structures may be performed by conventional fabrication techniques. Also note, any drawings accompanying the application are for illustrative purposes only, and are thus not drawn to scale. Additionally, elements common between figures may retain the same numerical designation.

As used herein, the terms "comprising," "including," "containing," "characterized by," and grammatical equivalents thereof are inclusive or open-ended teams that do not exclude additional, unrecited elements or method steps, but also include the more restrictive terms "consisting of" and "consisting essentially of" and grammatical equivalents thereof.

As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be excluded.

As used herein, the term "configured" refers to a size, shape, material composition, and arrangement of one or more of at least one structure and at least one apparatus facilitating operation of one or more of the structure and the apparatus in a pre-determined way.

As used herein, the singular forms "a," "an," and "the" are intended to include the plural forms as well, unless the context clearly indicates otherwise.

As used herein, the term "and/or" includes any and all combinations of one or more of the associated listed items.

As used herein, the term "substantially," in reference to a given parameter, property, or condition, means to a degree that one of ordinary skill in the art would understand that the given parameter, property, or condition is met with a small degree of variance, such as within acceptable manufacturing tolerances.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped, etc.) and the spatially relative descriptors used herein interpreted accordingly.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

FIG. 1 is a simplified flow diagram illustrating a method 100 of forming a flexible structure, such as a flexible structure for use in an aerospace application (e.g., a flexible seal for a rocket motor assembly), in accordance with embodiments of the disclosure. The method 100 includes a mixing process 102 including forming a polysiloxane composition including at least two different silicone materials; a structure formation process 104 including forming the polysiloxane composition into a preliminary structure; and a curing process 106 including crosslinking polysiloxane chains of the preliminary structure. With the description as provided below, it will be readily apparent to one of ordinary skill in the art that the method described herein may be used in various applications. In other words, the method may be used whenever it is desired to form a flexible structure exhibiting desired material properties (e.g., mechanical properties, rheological properties, physical properties, chemical properties, etc.).

The mixing process 102 includes combining at least two different silicone materials, and, optionally, at least one additive to form a polysiloxane composition exhibiting desired material properties (e.g., rheological properties, such as Shore A hardness). As used herein the term, "silicone material" means and includes a material (e.g., resin, rubber, etc.) formed of and including a polysiloxane compound. The polysiloxane compound of each of the different silicone materials may independently exhibit the following chemical structure:

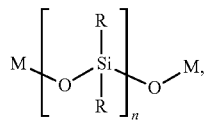

where, as described in further detail below, n is an integer from 2 to 10,000 (e.g., from 100 to 5,000); each R is independently a pendant functional group; and each M is independently a reactive capping group.

Each R group may independently comprise hydrogen, an aliphatic group, a cyclic group, or a combination thereof. As used herein, the term "aliphatic group" means and includes a saturated or unsaturated, substituted or unsubstituted, linear or branched hydrocarbon group, such as an alkyl group, an alkenyl group, and an alkynyl group. A suitable alkyl group may be a saturated or unsaturated, substituted or unsubstituted, linear or branched hydrocarbon group having from 1 to 10 carbon atoms (e.g., methyl, ethyl, propyl, butyl, pentyl, hexyl, heptyl, octyl, substituted derivatives thereof, etc.). A suitable alkenyl group may be a saturated or unsaturated, substituted or unsubstituted, linear or branched hydrocarbon group including from 2 to 10 carbon atoms and at least one carbon-carbon double bond. A suitable alkynyl group may be a saturated or unsaturated, substituted or unsubstituted, linear or branched hydrocarbon group including from 2 to 10 carbon atoms and at least one carbon-carbon triple bond. Optionally, the aliphatic group may include one or more heteroatoms (i.e., an element other than carbon and hydrogen, such as oxygen, nitrogen, sulfur, or silicon). In some embodiments, each R group is a methyl group. As used herein, the term "cyclic linkage" means and includes at least one saturated or unsaturated, substituted or unsubstituted, closed ring hydrocarbon group, such as an alicyclic group, an aryl group, or a combination thereof. A suitable alicyclic group may be a saturated or unsaturated, substituted or unsubstituted, closed ring hydrocarbon group including from 5 to 8 carbons (e.g., cyclopentyl, cyclohexyl, cycloheptyl, cyclooctyl, substituted derivatives thereof, etc.). A suitable aryl group may include a saturated or unsaturated, substituted or unsubstituted, closed aromatic ring or a saturated or unsaturated, substituted or unsubstituted, closed aromatic ring system (e.g., phenyl, biphenyl, substituted derivatives thereof, etc.). Optionally, the cyclic group may include one or more heteroatoms. By way of non-limiting example, the cyclic group may be at least one of a heteroalicyclic group and a heteroarylene group (e.g., furyl, thienyl, pyridyl, substituted derivatives thereof, etc.). In embodiments wherein at least one R group is unsaturated, the R group may, optionally, include a moiety configured to react with another compound to form a chemical bond under conventional reaction conditions, such as those employed in hydrosilylation, condensation, addition, esterification, etherification, Michael reaction, imidation, amination, sulfonation, and the like. For example, each R group may independently include a vinyl moiety, a silanol moiety, an allyl moiety, a vinylcyclohexyl moiety, a styryl moiety, or a propargyl moiety.

Each M group may comprise a terminal functional group configured to react with another compound to form a chemical bond under conventional reaction conditions, such as those employed in hydrosilylation, condensation, addition, esterification, etherification, Michael reaction, imidation, amination, sulfonation, and the like. By way of non-limiting example, each M group may comprise a vinyl group, a silanol group, an allyl group, a vinylcyclohexyl group, a styryl group or a propargyl group. In some embodiments, each M group is a vinyl group. The M groups may facilitate crosslinking of each polysiloxane compound with at least one other polysiloxane compound to form the flexible structure, as described in further detail below.

The different silicone materials of the polysiloxane composition may comprise different grades of a single polysiloxane, and/or may comprise different polysiloxanes. Different grades of a single polysiloxane may, for example, exhibit substantially the same general chemical structure (e.g., the same R groups and M groups as one another), but different molecular weights (e.g., different polymer chain lengths than one another). In contrast, different polysiloxanes may, for example, exhibit different chemical structures (e.g., different R groups than one another, different M groups than one another, etc.), and may also exhibit substantially the same or different molecular weights. In some embodiments, each of the different silicone materials of the polysiloxane composition is formed of and includes a different grade of the same polysiloxane. In additional embodiments, at least one of the different silicone materials of the polysiloxane composition is formed of and includes a different polysiloxane than at least one other of the different silicone materials of the polysiloxane composition.

As a non-limiting example, one or more of the different silicone materials of the polysiloxane composition may independently be formed of and include a linear polysiloxane compound having a polymer backbone comprising repeating units of dimethylsiloxane, methylethylsiloxane, methylphenylsiloxane, diethylsiloxane, ethylphenylsiloxane, or diphenylsiloxane; and reactive capping groups comprising vinyl, silanol, allyl, vinylcyclohexyl, styryl, or propargyl. At least one of the different silicone materials may, for example, be formed of and include a vinyl-terminated polydimethylsiloxane, a vinyl-terminated polymethylethylsiloxane, a vinyl-terminated polymethylphenylsiloxane, a vinyl-terminated polydiethylsiloxane, a vinyl-terminated polyethylphenylsiloxane, a vinyl-terminated polydiphenylsiloxane, or combinations thereof. In some embodiments, the different silicone materials of the polysiloxane composition are formed of and include different vinyl-terminated polydimethylsiloxane compounds (e.g., vinyl-terminated polydimethylsiloxane compounds exhibiting different molecular weights than one another). Suitable silicone materials are commercially available from various sources, such as from Wacker Chemie AG (Adrian, Mich.) at least under the ELASTOSIL® (e.g., ELASTOSIL® R401/10 resin, ELASTOSIL® R401/20 resin, etc.) tradename. In some embodiments, a first of the different silicone materials is ELASTOSIL® R401/10 resin, and a second of the different silicone materials is ELASTOSIL® R401/20 resin.

If included, the additive may comprise at least one material that promotes the formation of a flexible structure from the polysiloxane composition, and/or enhances at least one material property (e.g., shear modulus) of the flexible structure to be formed from the polysiloxane composition. For example, the additive may comprise at least one crosslinking/curing agent that enhances at least one of close packing of polysiloxane chains of the different silicone materials and crosslinking of polysiloxane chains of the different silicone materials during and/or after the formation of a flexible structure from the polysiloxane composition. The type and amount of crosslinking/curing agent may at least partially depend on the different silicone materials utilized, and on the desired properties of the flexible structure to be formed, as described in further detail below. The crosslinking/curing agent may, for example, comprise at least one of an organic peroxide (e.g., dicumyl peroxide, bis-(2,4-dichlorobenzoyl)-peroxide, etc.), a platinum-based crosslinking/curing agent, and a tin-based crosslinking/curing agent. In some embodiments, the crosslinking/curing agent comprises dicumyl peroxide. Suitable crosslinking/curing agents are commercially available from various sources, such as from Arkema, Inc. (King of Prussia, Pa.) at least under the DI-CUP® (e.g., DI-CUP® 40C, DI-CUP® 40KE, etc.) tradename. The crosslinking/curing agent may, for example, be present in the polysiloxane composition at from about 0 parts per hundred parts of resin (phr) to about 2.5 phr, such as from about 1.5 phr to about 2.0 phr, or about 2.0 phr. In some embodiments, the polysiloxane composition comprises at about 2.0 phr organic peroxide additive. In additional embodiments, the additive may comprise at least one of a cure accelerator, an adhesion promoter, a lubricant, a filler, and a pigment. In further embodiments, the polysiloxane composition may be substantially free of additives other than crosslinking/curing agents.

The quantity (e.g., amount, parts, etc.) and types of the different components of the polysiloxane composition may be selected to provide the polysiloxane composition, and a flexible structure subsequently formed from the polysiloxane composition, desired material properties (e.g., rheological properties, mechanical properties, physical properties, chemical properties, etc.). For example, the quantity and type of each of the different silicone materials and the additive(s) (if any) of the polysiloxane composition may be selected to provide the polysiloxane composition a desired Shore A hardness, and to provide a flexible structure formed from the polysiloxane composition a desired shear modulus. The desired Shore A hardness may be determined at least partially based on a chosen method of forming the flexible structure, and the desired shear modulus may be determined at least partially based on the desired end-use of the flexible structure. By way of non-limiting example, at least in embodiments wherein the flexible structure comprises a component (e.g., a flexible seal) of a rocket motor assembly, the quantity and type of the different silicone materials and the additive(s) (if any) may be selected relative to one another to tailor the Shore A hardness of the polysiloxane composition to a desired value less than about 24 at a temperature within a range of from about 20° C. to about 100° C., and to tailor the shear modulus of the subsequently formed flexible structure to a desired value less than about 26 pounds per square inch (psi). The different silicone materials may be included in any ratio relative to another that facilitates the desired Shore A hardness of the polysiloxane composition and the desired shear modulus of the subsequently formed flexible structure. As a non-limiting example, a first silicone material having a Shore A hardness within a range of from about 13 to about 17 and a second silicone material having a Shore A hardness within a range of from about 20 to about 24 may each be selected and then combined in a pre-determined ratio, along with a selected crosslinking/curing agent (if any), to produce a polysiloxane composition having a desired Shore A hardness less than about 24 that may subsequently be cured to form a flexible structure exhibiting a shear modulus less than about 26 psi.

The polysiloxane composition may be substantially homogeneous (e.g., the different silicone materials and any additives may be uniformly dispersed throughout the polysiloxane composition), or may be heterogeneous (e.g., at least one of the different silicone materials and/or at least one additive may be non-uniformly dispersed throughout the polysiloxane composition). In some embodiments the polysiloxane composition is substantially homogeneous as formed.

The polysiloxane composition may be formed from the different silicone materials and any additive(s) using conventional processes (e.g., conventional material addition processes, conventional mixing processes, etc.) and conventional processing equipment, which are not described in detail herein. By way of non-limiting example, relatively less viscous silicone materials may be added to and mixed with relatively more viscous silicone materials in sequence to form a master batch, and then additive(s) (e.g., a cure package at least including a crosslinking/curing agent), if any, may be added to and mixed with the master batch. If included, the additive(s) may, for example, be added to and mixed with the master batch by way of a two roll mill.

With continued reference to FIG. 1, the structure formation process 104 includes forming the polysiloxane composition into a preliminary structure. The preliminary structure may comprise a bulk structure, or may comprise a film (e.g., layer, coating, etc.) at least partially coating another structure. For example, a volume of the polysiloxane composition may be subjected to a conventional molding process (e.g., an injection molding process, a compression molding process, a transfer molding process, etc.) to form the preliminary structure to comprise a bulk structure of a desired shape and size. As another example, a volume of the polysiloxane composition may be subjected to a conventional extrusion process to form the preliminary structure to comprise a bulk structure of a desired shape and size. As a further example, the polysiloxane composition may be subjected to a conventional deposition process (e.g., a solution casting process) to form the preliminary structure to comprise a film of desired dimensions (e.g., length, width, thickness) on or over another structure.

Following formation, the preliminary structure may be subjected to the curing process 106 to form a flexible structure. The curing process 106 may enhance at least one of close packing of polysiloxane chains and crosslinking of polysiloxane chains of the preliminary structure such that the flexible structure formed therefrom exhibits one or more different, desired material properties (e.g., shear modulus, elastic modulus, bulk modulus, thermal resistance, tensile strength, hardness, abrasion resistance, chemical resistance, extrusion resistance, elongation, etc.) relative to the preliminary structure. As used herein, the terms "crosslink" and "crosslinking" refer to a process in which more than one polymer chain, or more than one portion of a long polymer chain, are joined together by at least one chemical bond (e.g., a covalent bond). The crosslinking may, for example, be facilitated through chemical reactions between a crosslinking/curing agent of the polysiloxane composition and the reacting capping groups of the polysiloxane compounds of the different silicone materials of the polysiloxane composition. In additional embodiments, the crosslinking may be facilitated without the use of a crosslinking/curing agent. The curing process 106 may include subjecting the preliminary structure to at least one of elevated temperature(s) and elevated pressure(s) (e.g., using a conventional curing apparatus, such as an autoclave, a compression mold, a heat gun, a lamination press, etc.) for a sufficient period of time to at least partially crosslink the polysiloxane chains of the preliminary structure. By way of non-limiting example, the preliminary structure may be subjected to (e.g., heated at) a temperature less than or equal to about 300° C. (e.g., within a range of from about 50° C. to about 300° C., such as from about 100° C. to about 250° C., or from about 150° C. to about 200° C.) for a period of time within a range of from about 5 minutes to about 10 hours (from about 10 minutes to about 5 hours, such as from about 10 minutes to about 2 hours, or from about 10 minutes to about 1 hour) to cure the preliminary structure and form the flexible structure. In some embodiments, the curing process 106 facilitates the formation of a flexible structure having a shear modulus less than about 26 psi.

Figure 2:
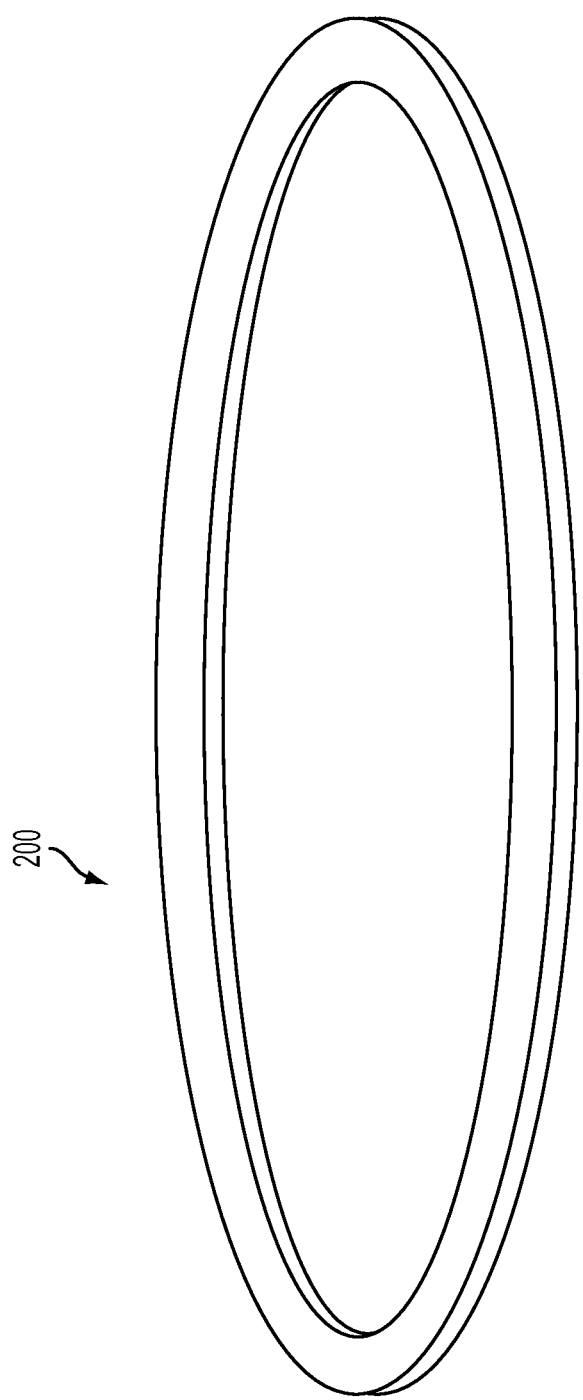
FIG. 2 is a simplified perspective view of a flexible structure of an embodiment of the disclosure, formed in accordance with the method shown in FIG. 1.

FIG. 2 is a perspective view a flexible structure 200 (e.g., flexible seal), in accordance with an embodiment of the disclosure. The flexible structure 200 may be formed according to the methods previously described herein with reference to FIG. 1. As shown in FIG. 2, the flexible structure 200 may comprise an annular (e.g., ring-shaped) structure for use in an aerospace application. In some embodiments, the flexible structure 200 may comprise a flexible seal configured to be incorporated into and used into a component (e.g., a flexible bearing assembly, a thermal protection assembly) of a rocket motor assembly, as described in further detail below. While FIG. 2 depicts the flexible structure 200 as an annular structure, the flexible structure 200 may exhibit a different geometric configuration (e.g., shape and size). The flexible structure 200 may, for example, exhibit a conical shape, a pyramidal shape, a cubic shape, cuboidal shape, a spherical shape, a hemispherical shape, a cylindrical shape, a semicylindrical shape, truncated versions thereof such as, for example, a frusto-conical shape, or an irregular shape. Irregular shapes include complex shapes, such as shapes associated with aerospace structures, devices, and assemblies.

Figure 3:
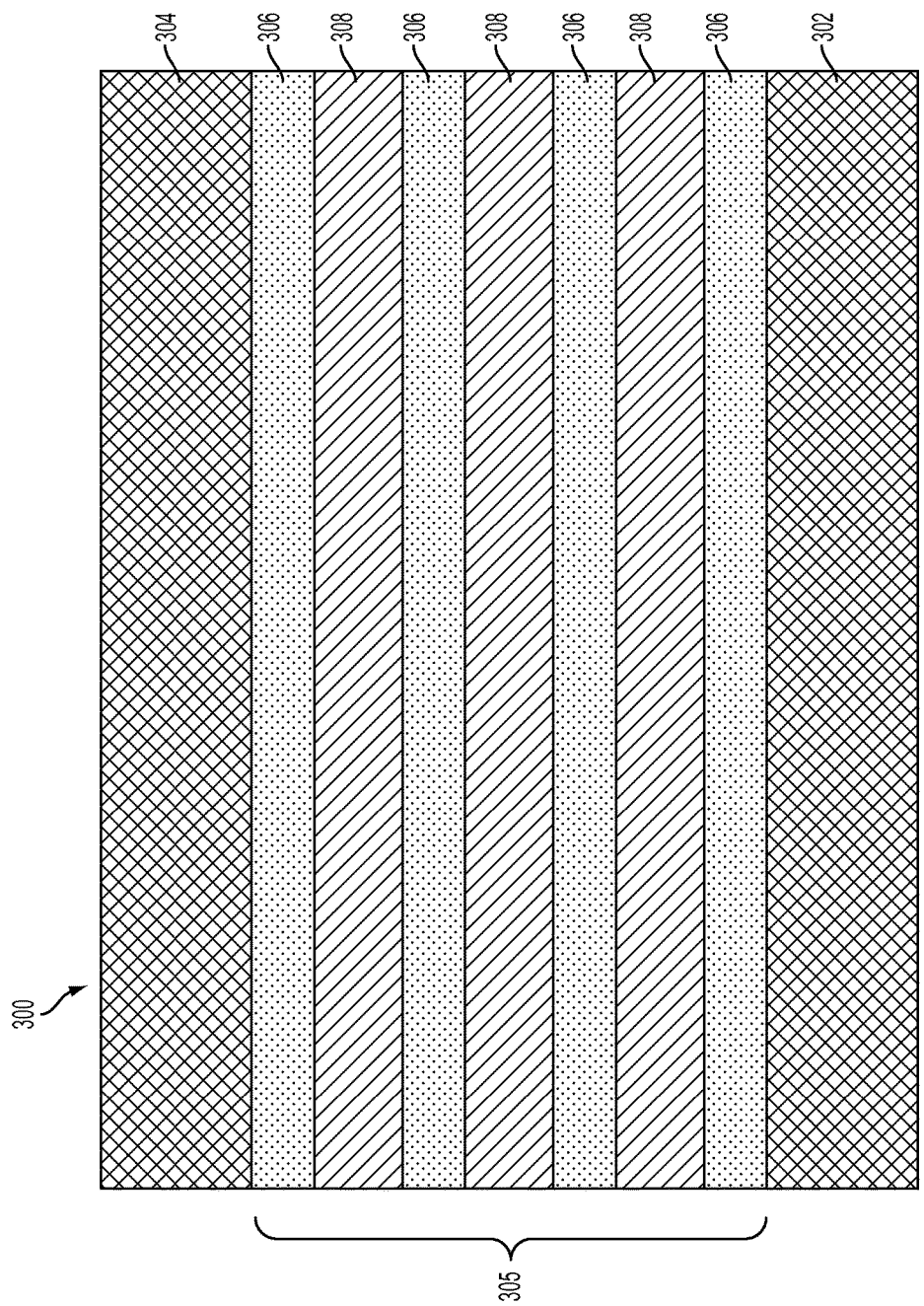
FIG. 3 is a simplified cross-sectional view of a flexible assembly, in accordance with an embodiment of the disclosure.

FIG. 3 is a cross-sectional view of a flexible assembly 300, in accordance with an embodiment of the disclosure. The flexible assembly 300 may include a first substrate 302, a second substrate 304, and a lamination 305 comprising an alternating sequence of flexible structures 306 and rigid structures 308 extending between the first substrate 302 and the second substrate 304. One or more of the flexible structures 306 may be substantially similar to the flexible structure 200 previously described herein with reference to FIG. 2. The flexible assembly 300 may, for example, comprise a flexible bearing assembly or a thermal protection assembly for a moveable thrust nozzle assembly of a rocket motor assembly, as described in further detail below.

The first substrate 302 and the second substrate 304 may each independently be formed of and include at least one rigid material, such as a rigid material suitable for use in an aerospace environment. By way of non-limiting example, the first substrate 302 and the second substrate 304 may each independently be formed of and include at least one thermally stable material, such as a composite material (e.g., a carbon cloth phenolic composite material, a glass cloth phenolic composite material, a ceramic-metal composite material, etc.), a metal (e.g., tungsten, titanium, molybdenum, niobium, vanadium, hafnium, tantalum, chromium, zirconium, iron, nickel, copper, aluminum, silicon, etc.), a metal alloy (e.g., a cobalt-based alloy, an iron-based alloy, a nickel-based alloy, an iron- and nickel-based alloy, a cobalt- and nickel-based alloy, an iron- and cobalt-based alloy, an aluminum-based alloy, a copper-based alloy, a magnesium-based alloy, a titanium-based alloy, a steel, a low-carbon steel, a stainless steel, etc.), and a ceramic (e.g., carbides, nitrides, oxides, and/or borides, such as carbides and borides of at least one of tungsten, titanium, molybdenum, niobium, vanadium, hafnium, tantalum, chromium, zirconium, aluminum, and silicon). In some embodiments, the first substrate 302 and the second substrate 304 each independently comprise at least one of a composite material, a metal, and a metal alloy. In addition, the first substrate 302 and the second substrate 304 may each independently exhibit a desired geometric configuration (e.g., shape and size). In some embodiments, the first substrate 302 and the second substrate 304 comprise opposing annular structures (e.g., opposing end-rings). The first substrate 302 and the second substrate 304 may exhibit substantially the same material composition and geometric configuration as one another, or the first substrate 302 may exhibit at least one of a different material composition and a different geometric configuration than the second substrate 304. The first substrate 302 and the second substrate 304 may each be formed using conventional processes and conventional processing equipment, which are not described in detail herein.

Each of the rigid structures 308 (e.g., rigid shims) also may be independently formed of and include at least one rigid material, such as a rigid material suitable for use in an aerospace environment. By way of non-limiting example, each of the rigid structures 308 may independently be formed of and include at least one thermally stable material, such as a composite material (e.g., a carbon cloth phenolic composite material, a glass cloth phenolic composite material, a ceramic-metal composite material, etc.), a metal (e.g., tungsten, titanium, molybdenum, niobium, vanadium, hafnium, tantalum, chromium, zirconium, iron, nickel, copper, aluminum, silicon, etc.), a metal alloy (e.g., a cobalt-based alloy, an iron-based alloy, a nickel-based alloy, an iron- and nickel-based alloy, a cobalt- and nickel-based alloy, an iron- and cobalt-based alloy, an aluminum-based alloy, a copper-based alloy, a magnesium-based alloy, a titanium-based alloy, a steel, a low-carbon steel, a stainless steel, etc.), and a ceramic (e.g., carbides, nitrides, oxides, and/or borides, such as carbides and borides of at least one of tungsten, titanium, molybdenum, niobium, vanadium, hafnium, tantalum, chromium, zirconium, aluminum, and silicon). In some embodiments, the rigid structures 308 each independently comprise at least one of a composite material, a metal, and a metal alloy. The rigid structures 308 may each exhibit substantially the same material composition, or at least one of the rigid structures 308 may exhibit a different material composition than at least one other of the rigid structures 308. In addition, each of the rigid structures 308 may independently exhibit a desired geometric configuration (e.g., shape and size). The rigid structures 308 may each exhibit substantially the same geometric configuration (e.g., substantially the same shape, and substantially the same size) as one another, or at least one of the rigid structures 308 may exhibit a different geometric configuration (e.g., a different shape, and/or a different size) than at least one other of the rigid structures 308. In some embodiments, the rigid structures 308 comprise annular structures having a common center but different diameters. The diameters of the rigid structures 308 may, for example, sequentially increase in a direction extending from one of the first substrate 302 and the second substrate 304 to the other of the first substrate 302 and the second substrate 304. The rigid structures 308 may each be formed using conventional processes and conventional processing equipment, which are not described in detail herein.

Each of the flexible structures 306 may be configured at least partially based on the configurations of each other component of flexible assembly 300 to provide the flexible assembly 300 with desired properties. For example, each of the flexible structures 306 may be cooperatively configured relative to each other of the flexible structures 306, the rigid structures 308, the first substrate 302, and the second substrate 304 to facilitate desired movements (e.g., lateral movements) of one or more portions of the flexible assembly 300 during use and operation of the flexible assembly 300. The desired movements may, for example, be tailored to a desired flight path (e.g., trajectory) of a rocket motor assembly including the flexible assembly 300. By way of non-limiting example, each of the flexible structures 306 may independently exhibit a configuration permitting a component, such as a thrust nozzle, of a rocket motor assembly including the flexible assembly 300 (e.g., as a flexible bearing assembly) to change direction in a pre-determined way during use and operation (e.g., in order to reach a target destination) at least partially based on a change in the position of the flexible assembly 300.

Each of the flexible structures 306 may exhibit substantially the same material properties, or at least one of the flexible structures 306 may exhibit a different material property than at least one other of the flexible structures 306. The material composition of each of the flexible structures 306 may be tailored to provide each of the flexible structures 306 substantially the same material properties, or to provide at least one of the flexible structures 306 a different material property than at least one other of the flexible structures 306. In some embodiments, each of the flexible structures 306 exhibits substantially the same material properties as each other of the flexible structures 306. Flexible structures 306 exhibiting substantially the same material properties may each be formed of and include substantially the same material composition (e.g., substantially the same cured polysiloxane composition, including substantially the same crosslinked polysiloxane chemical structures, substantially the same crosslinked polysiloxane molecular weight, and substantially the same quantity of crosslinked polysiloxanes), or at least one of the flexible structures 306 may be formed of and include a different material composition (e.g., a different cured polysiloxane composition, including a different crosslinked polysiloxane chemical structure, a different crosslinked polysiloxane molecular weight, and/or a different quantity of crosslinked polysiloxanes) than at least one other of the flexible structures 306. In some embodiments, at least one of the flexible structures 306 exhibits a different material property than at least one other of the flexible structures 306. Flexible structures 306 exhibiting at least one different material property than one another may exhibit different material compositions (e.g., different cured polysiloxane compositions, including different crosslinked polysiloxane chemical structures, different crosslinked polysiloxane molecular weights, and/or different quantities of crosslinked polysiloxanes) than one another. The material composition (and, hence, material properties) of each of the flexible structures 306 may be controlled at least partially by selecting the quantities and types of the different silicone materials and additive(s) (if any) present within the polysiloxane composition(s) utilized to form each of the flexible structures 306, in accordance with the methods previously described herein in relation to FIG. 1. In some embodiments, each of the flexible structures 306 have substantially the same shear modulus of less than about 26 psi. In additional embodiments, each of the flexible structures 306 has a shear modulus less than about 26 psi, but at least one of the flexible structures 306 has a different shear modulus than at least one other of the flexible structures 306.

Each of the flexible structures 306 may exhibit substantially the same geometric configuration (e.g., substantially the same shape, and substantially the same size), or at least one of the flexible structures 306 may exhibit a different geometric configuration (e.g., a different shape, and/or a different size) than at least one other of the flexible structures 306. In some embodiments, each of the flexible structures 306 exhibits substantially the same shape, but at least one of the flexible structures 306 exhibits a different size (e.g., a different length, a different width, and/or a different height) than at least one of the flexible structures 306. For example, the flexible structures 306 may comprise annular structures (e.g., similar to the flexible structure 200 previously described in relation to FIG. 2) having a common center but different diameters. The diameters of the flexible structures 306 may, for example, sequentially increase in a direction extending from one of the first substrate 302 and the second substrate 304 to the other of the first substrate 302 and the second substrate 304. The geometric configurations selected for the flexible structures 306 may at least partially depend on the geometric configurations of the other components (e.g., the first substrate 302, the second substrate 304, the rigid structures 308, etc.) of the flexible assembly 300. Each of the flexible structures 306 may independently be formed according to the methods previously described herein with reference to FIG. 1.

The flexible assembly 300 may be formed of and include any quantity and sequence (e.g., pattern) of the flexible structures 306 and the rigid structures 308 facilitating movement of the flexible assembly 300 in a pre-determined way. By way of non-limiting example, as shown in FIG. 3, the lamination 305 may be formed of and include a nested, alternating sequence of a desired number of the flexible structures 306 and the rigid structures 308, beginning with one of the flexible structures 306 at a location proximate (e.g., adjacent) the first substrate 302 and ending with another of the flexible structures 306 at another location proximate (e.g., adjacent) the second substrate 304. While FIG. 3 depicts the flexible assembly 300 as being formed of and including an alternating sequence of four (4) flexible structures 306 and three (3) the rigid structures 308, the flexible assembly 300 may include a different number of flexible structures 306 and rigid structures 308. For example, the flexible assembly 300 may include from one (1) to one hundred (100) of the flexible structures 306, and from zero (0) to one hundred (100) of the rigid structures 308. The quantity and the sequence of the flexible structures 306 and the rigid structures 308 may at least partially depend on the configurations (e.g., material compositions, shapes, sizes, etc.) of the flexible structures 306 and the rigid structures 308 of the flexible assembly 300. The quantity and the sequence of the flexible structures 306 and the rigid structures 308 may also at least partially depend on the configurations of additional structures and/or assemblies (e.g., thrust nozzle assemblies, rocket motor assemblies, etc.) with which the flexible assembly 300 is to be operatively associated (e.g., included in), as described in further detail below.

The flexible assembly 300 may be formed by adhering (e.g., bonding, attaching, coupling, etc.) a first of the flexible structures 306 to the first substrate 302, adhering a first of the rigid structures 308 to the first of the flexible structures 306, adhering a second of the flexible structures 306 to the first of the rigid structures 308, adhering a second of the rigid structures 308 to the second of the flexible structures 306, and so on for a desired quantity of the flexible structures 306 and the rigid structures 308. The second substrate 304 may be adhered to a last of the flexible structures 306 (e.g., a flexible structure 306 adhered to a last of the rigid structures 308). At least one adhesive material may be used to adhere different components (e.g., the first substrate 302, the flexible structures 306, the rigid structures 308, and the second substrate 304) of the flexible assembly 300 to one another. By way of non-limiting example, for each of the flexible structures 306, an adhesive system formed of and including at least two adhesive materials (e.g., at least two adhesive layers) may be used to attach the flexible structure 306 to adjacent components (e.g., the first substrate 302, at least one of the rigid structures 308, and/or the second substrate 304) of the flexible assembly 300. The adhesive system may, for example, include a first adhesive material attached to the flexible structure 306 and a second adhesive material attached to the first adhesive material and to the other, adjacent component of the flexible assembly 300. The adhesive material (e.g., adhesive system) may be selected at least partially based on the material compositions of the flexible structures 306 and the other components of the flexible assembly 300 adjacent thereto. In some embodiments, substantially the same adhesive material (e.g., substantially the same adhesive system) is used to adhere each of the flexible structures 306 to other components of the flexible assembly 300 adjacent thereto. In additional embodiments, a different adhesive material (e.g., a different adhesive system) is used to adhere at least one of the flexible structures 306 to adjacent components of the flexible assembly 300 than is used to adhere at least one other of the flexible structures 306 to other components of the flexible assembly 300 adjacent thereto.

The material composition(s) of the flexible structures 306 may facilitate increased interfacial adhesion strength (e.g., stronger bond lines) between the flexible structures 306 and other, adjacent components of the flexible assembly 300 as compared to conventional flexible structures (e.g., conventional silicone-based flexible structures, such as flexible structures formed of and including a single silicone material rather than a combination of at least two different silicone materials). The increased interfacial adhesion strength may permit the use of relatively fewer materials and/or structures within the flexible assembly 300 as compared to conventional flexible assemblies (e.g., conventional flexible bearing assemblies for rocket motor assemblies), while at least maintaining or even improving the structural integrity of the flexible assembly 300 during use and operation as compared to such conventional flexible assemblies. For example, the material composition(s) of the flexible structures 306 may facilitate the omission of one or more carbon structures (e.g., carbon tapes) between the flexible structures 306 and one or more other, adjacent components of the flexible assembly 300, while maintaining or even decreasing the risk of delamination as compared to conventional flexible assemblies including one or more carbon structures between conventional flexible structures and one or more other, adjacent components of the conventional flexible assemblies.

Figure 4:
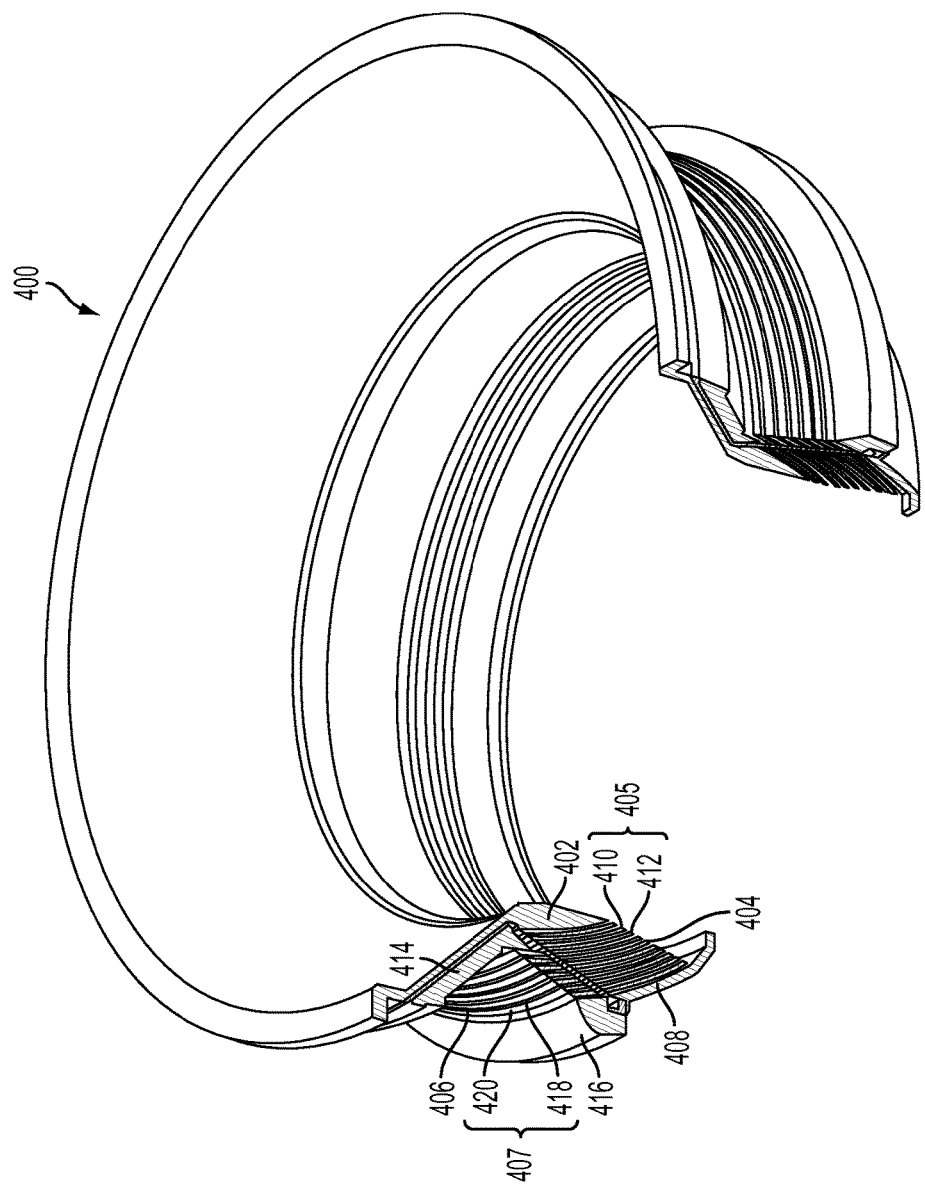
FIG. 4 is a simplified cut-away perspective view of a moveable thrust nozzle assembly, in accordance with an embodiment of the disclosure.

FIG. 4 is a cut-away perspective view of a moveable thrust nozzle assembly 400, in accordance with an embodiment of the disclosure. The moveable thrust nozzle assembly 400 may include a fixed housing 402, a flexible bearing assembly 404 coupled to (e.g., directly coupled to and/or indirectly coupled to) and circumscribing a portion of the fixed housing 402, and a thermal protection assembly 406 coupled to (e.g., directly coupled to and/or indirectly coupled to) and circumscribing another portion of the fixed housing 402. The flexible bearing assembly 404 may include an end-ring 408 and a lamination 405 comprising an alternating sequence of flexible structures 410 (e.g., flexible seals) and rigid structures 412 (e.g., rigid shims) in a nested relationship and extending between the fixed housing 402 and the end-ring 408. The thermal protection assembly 406 may be positioned adjacent (e.g., over and in contact with) the flexible bearing assembly 404, and may include a first (aft) end-ring 414, a second end-ring 416, and a lamination 407 comprising an alternating sequence of flexible structures 418 (e.g., flexible seals) and rigid structures 420 (e.g., rigid shims) in a nested relationship and extending between the first end-ring 414 and the second end-ring 416.

At least one of the flexible bearing assembly 404 and the thermal protection assembly 406 may be similar to the flexible assembly 300 previously described herein with reference to FIG. 3. The components and component arrangement of at least one of the flexible bearing assembly 404 and the thermal protection assembly 406 may, for example, be substantially similar to components and component arrangement of the flexible assembly 300 (FIG. 3). In some embodiments, the flexible structures 410 of the flexible bearing assembly 404 at least have material compositions similar to those previously discussed in relation to the flexible structures 306 (FIG. 3) of the flexible assembly 300 (FIG. 3). Each of the flexible structures 410 of the flexible bearing assembly 404 may be independently formed of and include crosslinked polysiloxane chains formed from at least two different silicone materials according to the methods previously described herein with reference to FIG. 1. In addition, the flexible structures 410 of the flexible bearing assembly 404 may be adhered to other, adjacent components of the flexible bearing assembly 404 in substantially the same manner as that previously described in relation to the flexible structures 306 of flexible assembly 300. In additional embodiments, the flexible structures 418 of the thermal protection assembly 406 at least have material compositions similar to those previously discussed in relation to the flexible structures 306 of flexible assembly 300. Each of the flexible structures 418 of the thermal protection assembly 406 may be independently formed of and include crosslinked polysiloxane chains formed from at least two different silicone materials according to the methods previously described herein with reference to FIG. 1. In addition, the flexible structures 418 of the thermal protection assembly 406 may be adhered to other, adjacent components of the thermal protection assembly 406 in substantially the same manner as that previously described in relation to the flexible structures 306 of flexible assembly 300. The material composition (and, hence, material properties) of each of the flexible structures 410 of the flexible bearing assembly 404 may be substantially similar to the material composition of each of the flexible structures 418 of the thermal protection assembly 406, or the material composition of at least one of the flexible structures 410 of the flexible bearing assembly 404 may be different than the material composition of at least one of the flexible structures 418 of the thermal protection assembly 406.

In some embodiments, except for the material composition(s) (and, hence, material properties) of the flexible structures 410 of the flexible bearing assembly 404 and/or the material composition(s) (and, hence, material properties) of flexible structures 418 of the thermal protection assembly 406, at least one of the moveable thrust nozzle assembly 400, the flexible bearing assembly 404, and the thermal protection assembly 406 may exhibit one or more components and/or component arrangements substantially similar to those described in U.S. Pat. No. 8,276,361 to Garbe, filed Jun. 14, 2007, issued Oct. 2, 2012, and assigned to the assignee of the present disclosure, the disclosure of which patent is hereby incorporated herein in its entirety by this reference.

Figure 5:
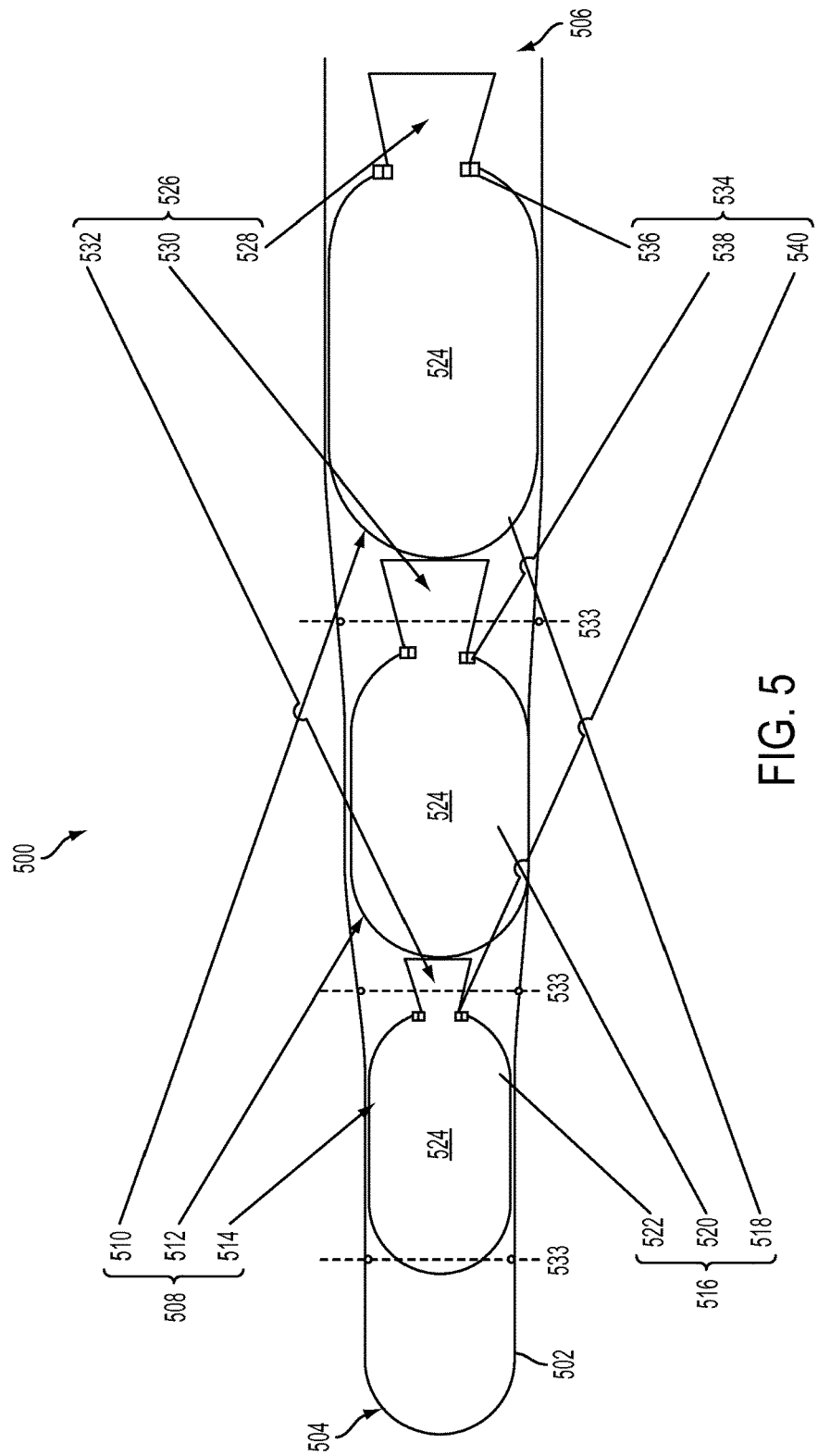
FIG. 5 is a simplified cross-sectional view of a multi-stage rocket motor assembly, in accordance with an embodiment of the disclosure.

FIG. 5 is a cross-sectional view of a rocket motor assembly 500, in accordance with an embodiment of the disclosure. The rocket motor assembly 500 may include an outer housing 502 having a closed forward end 504 and an open aft end 506. The outer housing 502 may comprise a single, substantially monolithic structure, or may comprise a plurality of connected (e.g., attached, coupled, bonded, etc.) structures. As used herein, the term "monolithic structure" means and includes a structure formed as, and comprising a single, unitary structure of a material. The rocket motor assembly 500 may also include plurality of stages 508 provided in an end-to-end relationship with one another within the outer housing 502. For example, as shown in FIG. 5, the rocket motor assembly 500 may include a first stage 510, a second stage 512, and a third stage 514 each contained within the outer housing 502. In additional embodiments, the rocket motor assembly 500 may include a different number of stages 508, such as from one (1) stage to ten (10) stages. The stages 508 may include vessels 516 (e.g., a first vessel 518, a second vessel 520, and a third vessel 522) each containing at least one propellant 524, and moveable thrust nozzle assemblies 526 (e.g., a first moveable thrust nozzle assembly 528, a second moveable thrust nozzle assembly 530, and a third moveable thrust nozzle assembly 532) physically connected to aft ends of the vessels 516. In addition, the outer housing 502 may be configured to be severable at locations 533, as indicated by dashed lines, associated with the stages 508 during use and operation of the rocket motor assembly 500 (e.g., following combustion of the propellant 524 within a given one of the stages 508). Each of the outer housing 502, the vessels 516, and the propellant(s) 524 may independently exhibit a desired configuration (e.g., material composition, size, shape, etc.), and may be formed using conventional processes and equipment, which are not described in detail herein.

At least one of the different moveable thrust nozzle assemblies 526 (e.g., the first moveable thrust nozzle assembly 528, the second moveable thrust nozzle assembly 530, and/or the third moveable thrust nozzle assembly 532) of the different stages 508 of the rocket motor assembly 500 may be similar to the moveable thrust nozzle assembly 400 previously described herein with reference to FIG. 4. The components and component arrangement of at least one of the moveable thrust nozzle assemblies 526 may, for example, be substantially similar to components and component arrangement of the moveable thrust nozzle assembly 400 (FIG. 4). The moveable thrust nozzle assemblies 526 may include flexible bearing assemblies 534 (e.g., a first flexible bearing assembly 536, a second flexible bearing assembly 538, and a third flexible bearing assembly 540), and at least one of the flexible bearing assemblies 534 may be substantially similar to the flexible bearing assembly 404 (e.g., including the flexible structures 410 and the rigid structures 412) (FIG. 4) of the moveable thrust nozzle assembly 400 (FIG. 4). One or more of the flexible bearing assemblies 534 may, for example, include flexible structures (e.g., flexible seals) each independently including crosslinked polysiloxane chains formed from at least two different silicone materials according to the methods previously described herein with reference to FIG. 1. The flexible structures may also be adhered to other, adjacent components of the at least one of the flexible bearing assemblies 534 in substantially the same manner as that previously described in relation to adhering the flexible structures 306 (FIG. 3) of the flexible assembly 300 (FIG. 3) to other, adjacent components of the flexible assembly 300.

In some embodiments, the material composition(s) of at least the flexible structures of each of the flexible bearing assemblies 534 (e.g., the first flexible bearing assembly 536, the second flexible bearing assembly 538, and the third flexible bearing assembly 540) of the different stages 508 (e.g., the first stage 510, the second stage 512, and the third stage 514) of the rocket motor assembly 500 are substantially similar to the material composition(s) of at least the flexible structures of each other of the flexible bearing assemblies 534 of the different stages 508 of the rocket motor assembly 500. The flexible structures of each of the flexible bearing assemblies 534 may include substantially the same material composition (e.g., cured polysiloxane composition) formed from at least two different silicone materials according to the methods previously described herein with reference to FIG. 1. For example, the flexible structures of each of the flexible bearing assemblies 534 may include substantially the same cured polysiloxane composition facilitating a shear modulus less than about 26 psi.

In additional embodiments, the material composition(s) of at least one of the flexible structures of at least one of the flexible bearing assemblies 534 (e.g., the first flexible bearing assembly 536, the second flexible bearing assembly 538, and/or the third flexible bearing assembly 540) of the different stages 508 of the rocket motor assembly 500 may be different than the material composition(s) of at least one other of the flexible structures of at least one other of the flexible bearing assemblies 534 of the different stages 508 of the rocket motor assembly 500. For example, the flexible structures of each of the flexible bearing assemblies 534 may each independently comprise crosslinking polymer chains formed from at least two different silicone materials according to the methods previously described herein with reference to FIG. 1, but at least one of the flexible structures of at least one of the flexible bearing assemblies 534 may include a different material composition than at least one other of the flexible structures of at least one other of the flexible bearing assemblies 534. In some embodiments, the flexible structures of each of the flexible bearing assemblies 534 have different material compositions (e.g., different cured polysiloxane compositions) than the flexible structures of each other of the flexible bearing assemblies 534. If at least one of the flexible structures of at least one of the flexible bearing assemblies 534 has a different material composition than at least one other of the flexible structures of at least one other of the flexible bearing assemblies 534, the at least one of the flexible structures may exhibit substantially similar material properties (e.g., substantially the same shear modulus) to the at least one other of the flexible structures, or may exhibit different material properties (e.g., a different shear modulus) than the at least one other of the flexible structures. For example, flexible structures of different flexible bearing assemblies 534 having different material compositions than one another may each have substantially the same shear modulus less than about 26 psi, or at least one of the flexible structures from the different flexible bearing assemblies 534 may have a different shear modulus less than about 26 psi than at least one other of the flexible structures from the different flexible bearing assemblies 534.

The methods of the disclosure facilitate the formation of flexible structures (e.g., flexible seals, etc.) and assemblies (e.g., flexible bearing assemblies, thermal protection assemblies, moveable thrust nozzle assemblies, rocket motor assemblies, etc.) exhibiting properties enabling the structures and assemblies to be used in a wider array of applications (e.g., aerospace applications) than many structures and assemblies conventionally utilized. Embodiments of the disclosure may be used to provide virtually infinite flexibility to tailor properties of a flexible structure, such as the shear modulus of the flexible structure, to particular end-use requirements of a structure or assembly including the flexible structure. The methods, structures, and assemblies according to embodiments of the disclosure provide a simplified means of controlling the movement of one or more components of a rocket motor assembly during use and operation of the rocket motor assembly as compared to conventional methods, structures, and assemblies. The flexible structures (e.g., the flexible structure 200 (FIG. 2)) formed according to embodiments of the disclosure may exhibit material properties suitable for a relatively wider variety of assemblies (e.g., flexible bearing assemblies, moveable thrust nozzle assemblies, rocket motor assemblies, etc.) and end-uses than corresponding flexible structures formed through conventional methods. Accordingly, the flexible structures and methods of the disclosure may facilitate or improve the standardization of components for such assemblies, and/or may enhance the fast and simple customization of components for such assemblies. The methods, structures, and assemblies of the disclosure may facilitate improved production efficiency (e.g., reduced production time, reduced material costs, etc.), and enhanced capabilities, performance, durability, and reliability as compared to conventional methods, structures, and assemblies.

The following examples serve to explain embodiments of the disclosure in more detail. The examples are not to be construed as being exhaustive or exclusive as to the scope of this disclosure.

EXAMPLES

Example 1: Rheological Properties of Various Flexible Structures

Figure 6:
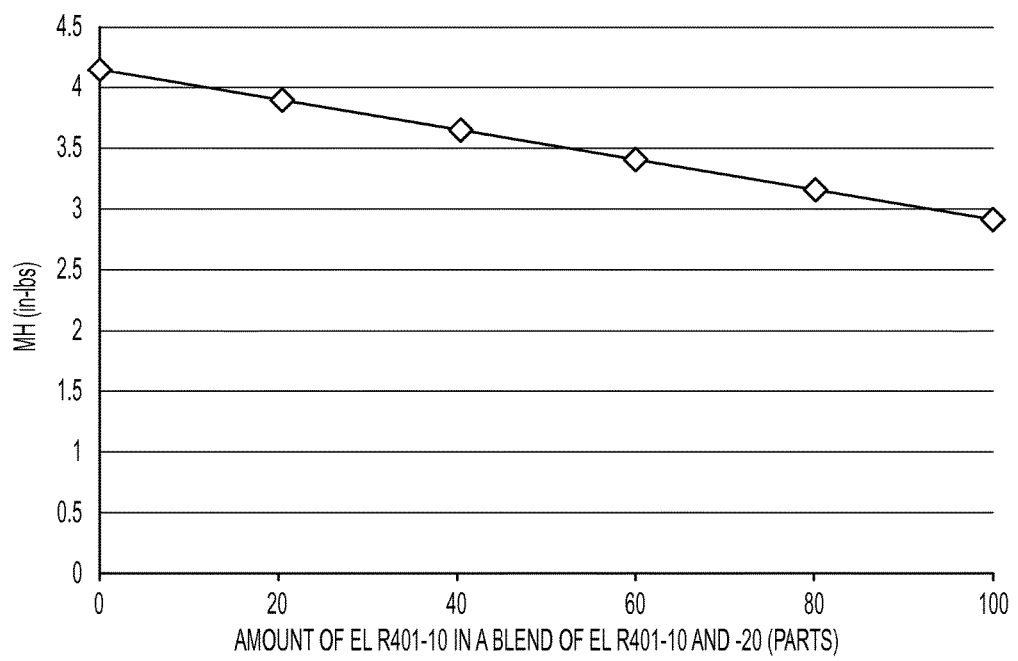
FIG. 6 is a graph of the results described in Example 1.

Different flexible structures formed in accordance with embodiments of the disclosure were prepared, and then the maximum torque (MH) of each of the different flexible structures was determined. The MH values were determined through conventional techniques using either a Moving Die Rheometer (MDR-2000) of Alpha Technologies (USA) or a Rubber Processing Analyzer (RPA-2000) of Alpha Technologies (USA). The different flexible structures were formed from different ratios of ELASTOSIL® R401/10 resin and ELASTOSIL® R401/20 resin, and about 2.0 phr of DI-CUP® 40KE dicumyl peroxide. ELASTOSIL® R401/10 resin was combined with ELASTOSIL® R401/20 resin on a two-roll mill, and then the DI-CUP® 40KE dicumyl peroxide was added to the resulting mixture. The two-roll mill was set at a differential speed setting of 20/25 and a nip of 0.1". Milling was done up to about 15 minutes to obtain uniform mass. FIG. 6 is a graph comparing the MH values for each of the different compositions, as analyzed by MDR-2000 after curing for about 12 minutes at 350° F. The linear correlation depicted in FIG. 6 indicates that ELASTOSIL® R401/10 resin and ELASTOSIL® R401/20 resin can be combined (e.g., blended) in various amounts to obtain desired material properties (e.g., rheological properties, mechanical properties, etc.) in the flexible structures formed therefrom.

Figure 7:
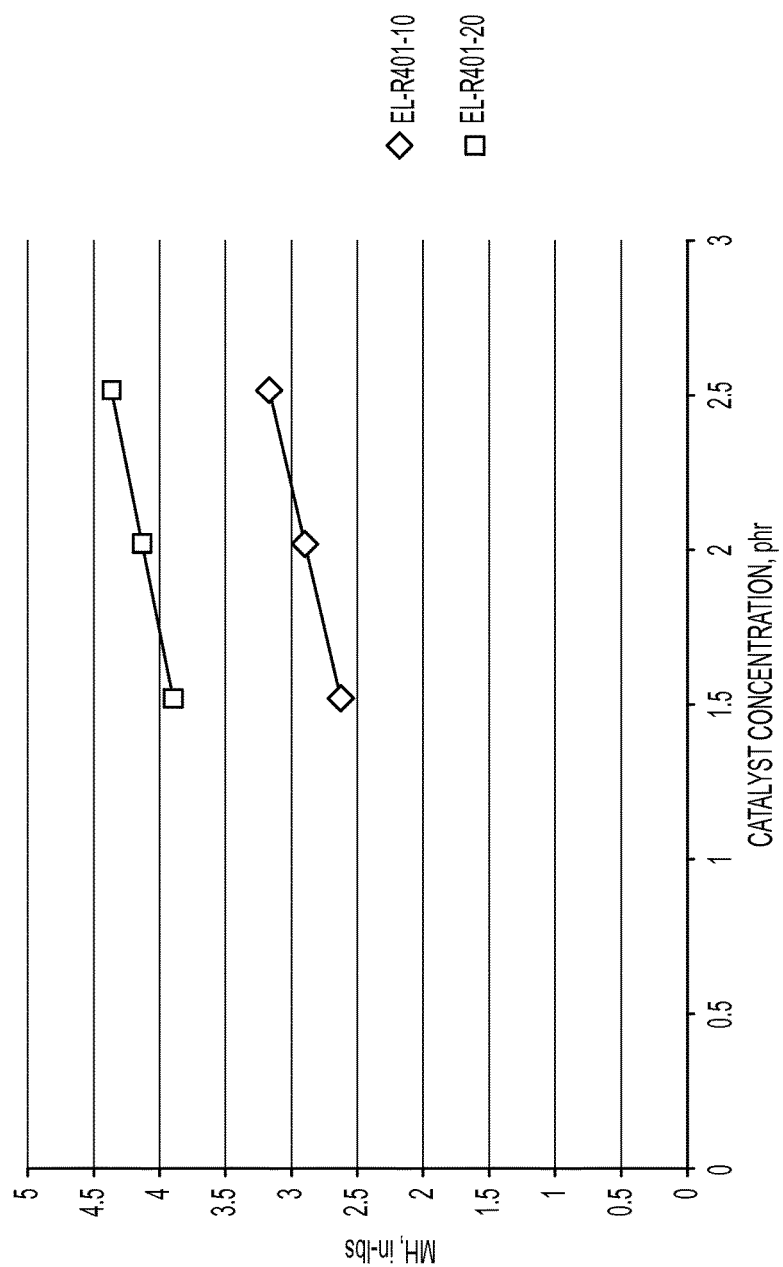
FIG. 7 is a graph of the results described in Example 2.

Example 2: Effects of Crosslinking/Curing Agent Concentration on Rheological Properties The effects of crosslinking/curing agent concentration on the MH values of different formulations formed from DI-CUP® 40KE dicumyl peroxide and ELASTOSIL® R401/10 resin or ELASTOSIL® R401/20 resin were analyzed. The MH values were determined through conventional techniques using a Moving Die Rheometer (MDR) of Alpha Technologies (USA). The different formulations included different concentrations of DI-CUP® 40KE within a range of from about 1.5 phr to about 2.5 phr. FIG. 7 is a graph comparing the MH values for each of the different formulations analyzed. The linear correlation depicted in FIG. 7 indicates that various amounts of DI-CUP® 40KE dicumyl peroxide can be combined with ELASTOSIL® R401/10 resin and ELASTOSIL® R401/20 resin to obtain desired material properties (e.g., rheological properties, mechanical properties, etc.) in flexible structures formed therefrom.

Figure 8:
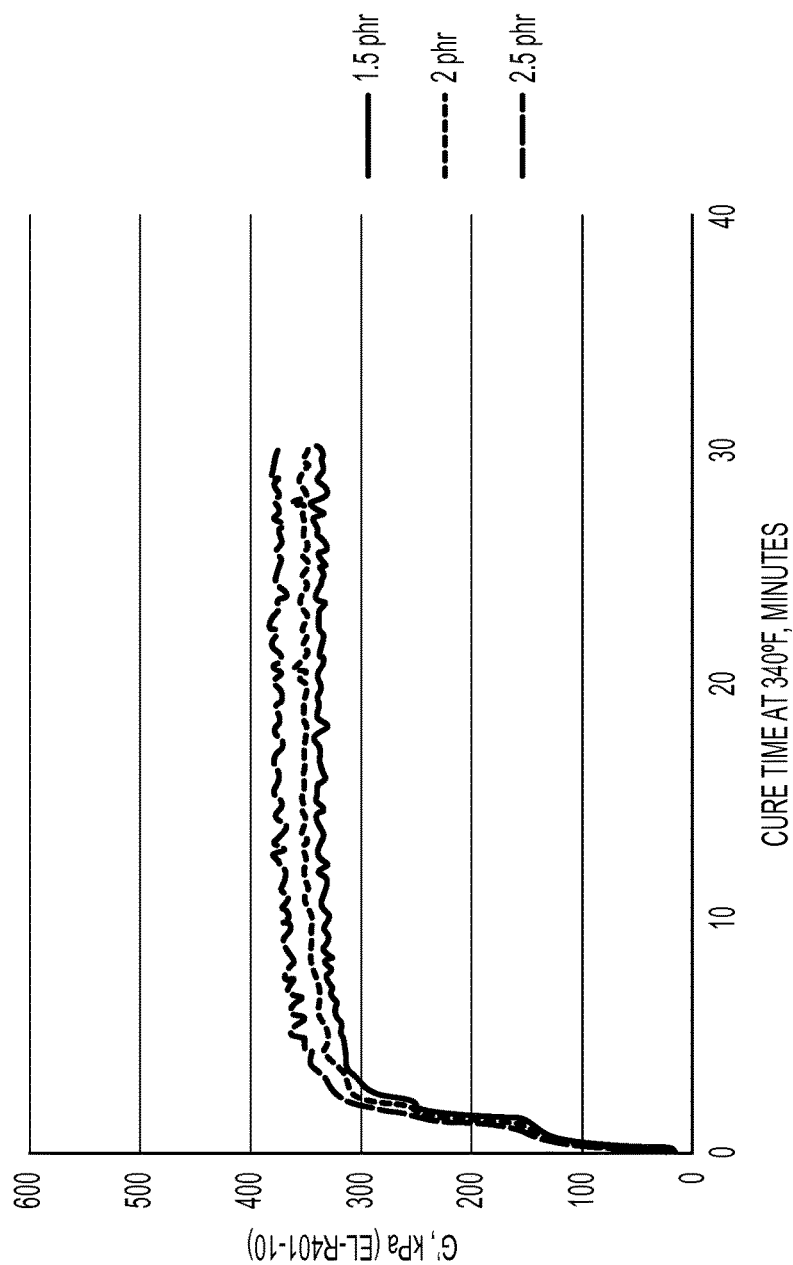
FIGS. 8 and 9 are graphs of the results described in Example 3.
Figure 9:
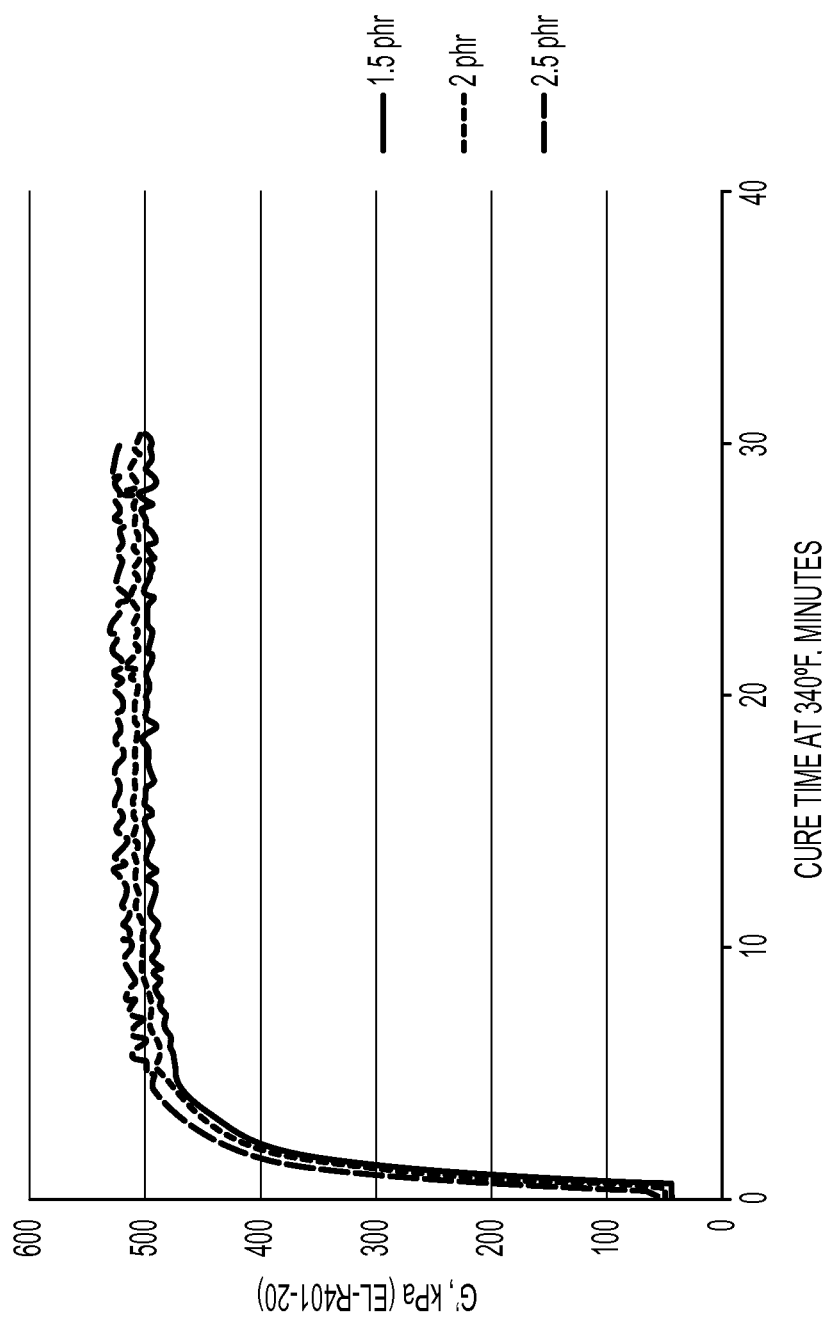

Example 3: Effects of Crosslinking/Curing Agent Concentration on the Flexible Structure Stability The effects of crosslinking/curing agent concentration on the stability of different formulations formed from DI-CUP® 40KE dicumyl peroxide and ELASTOSIL® R401/10 resin or ELASTOSIL® R401/20 resin was analyzed using conventional techniques. Product stability was analyzed for different concentrations of DI-CUP® 40KE dicumyl peroxide within a range of from about 1.5 phr to about 2.5 phr as a function of elastic shear modulus (G') at different cure times using a Rubber Processing Analyzer (RPA-2000) of Alpha Technologies (USA). FIG. 8 is a graph comparing the G' of ELASTOSIL® R401/10 resin with different concentrations of DI-CUP® 40KE dicumyl peroxide as a function of cure time at 340° F. FIG. 9 is a graph comparing the G' of ELASTOSIL® R401/20 resin with different concentrations of DI-CUP® 40KE dicumyl peroxide as a function of cure time at 340° F. As shown in FIGS. 8 and 9, no cure reversion behavior was witnessed, indicating that flexible structures formed from various concentrations of organic peroxide, ELASTOSIL® R401/10 resin, and ELASTOSIL® R401/20 resin will be stable as cured.

While the disclosure is susceptible to various modifications and alternative forms, specific embodiments have been shown by way of example in the drawings and have been described in detail herein. However, the disclosure is not intended to be limited to the particular forms disclosed. Rather, the disclosure encompasses all modifications, equivalents, and alternatives falling within the scope of the disclosure as defined by the following appended claims and their legal equivalents.

What is claimed is:

1. A flexible assembly for a rocket motor assembly, comprising:
    a first substrate;
    a second substrate overlying the first substrate; and
    a lamination comprising an alternating sequence of flexible structures and rigid structures extending between the first substrate and the second substrate, at least one of the flexible structures comprising a cured polysiloxane composition comprising crosslinked polysiloxane chains of at least two different silicone materials.

2. The flexible assembly of claim 1, wherein each of the flexible structures has a shear modulus substantially equivalent to that of each other of the flexible structures.

3. The flexible assembly of claim 1, wherein at least one of the flexible structures has a different shear modulus than at least one other of the flexible structures.

4. The flexible assembly of claim 1, wherein each of the flexible structures independently has a shear modulus less than 26 psi.

5. The flexible assembly of claim 1, wherein each of the flexible structures comprises the cured polysiloxane composition.

6. The flexible assembly of claim 1, wherein at least one other of the flexible structures comprises another cured polysiloxane composition comprising crosslinked polysiloxane chains of at least two other different silicone materials.

7. A moveable thrust nozzle assembly for a rocket motor assembly, comprising:
    a fixed housing; and
    at least one flexible assembly coupled to and circumscribing a portion of the fixed housing and comprising:
        a first substrate;
        a second substrate overlying the first substrate; and
        a lamination comprising an alternating sequence of flexible structures and rigid structures extending between the first substrate and the second substrate, at least one of the flexible structures comprising a substantially homogeneous, cured polysiloxane composition comprising crosslinked polysiloxane chains of at least two different silicone materials.

8. The moveable thrust nozzle assembly of claim 7, wherein each of the flexible structures of the lamination independently has a shear modulus less than 26 psi.

9. The moveable thrust nozzle assembly of claim 8, wherein each of the flexible structures of the lamination has a shear modulus substantially equivalent to that of each other of the flexible structures.

10. The moveable thrust nozzle assembly of claim 9, wherein each of the flexible structures of the lamination comprises the cured polysiloxane composition.

11. A rocket motor assembly, comprising:
    at least one stage comprising:
        a vessel containing a propellant structure; and
        a moveable thrust nozzle assembly connected to an end of the vessel and comprising:
            a fixed housing; and
            a flexible assembly coupled to and circumscribing a portion of the fixed housing and comprising:
                a first substrate;
                a second substrate overlying the first substrate; and
                a lamination comprising an alternating sequence of flexible structures and rigid structures extending between the first substrate and the second substrate, at least one of the flexible structures comprising a substantially homogeneous, cured polysiloxane composition comprising crosslinked polysiloxane chains of at least two different silicone materials.

12. The rocket motor assembly of claim 11, further comprising:
    at least one additional stage comprising:
        another vessel containing another propellant structure; and
        another moveable thrust nozzle assembly connected to an end of the another vessel and comprising:
            another fixed housing; and
            another flexible assembly coupled to and circumscribing a portion of the another fixed housing and comprising:
                another first substrate;
                another second substrate overlying the another first substrate; and
                another lamination comprising another alternating sequence of additional flexible structures and additional rigid structures extending between the another first substrate and the another second substrate, at least one of the additional flexible structures comprising another substantially homogeneous, cured polysiloxane composition comprising additional crosslinked polysiloxane chains of at least two different silicone materials.

13. The rocket motor assembly of claim 12, wherein each of the flexible structures of the flexible assembly and each of the additional flexible structures of the another flexible assembly independently has a shear modulus less than 26 psi.

14. The rocket motor assembly of claim 13, wherein each of the flexible structures of the flexible assembly has a shear modulus substantially equivalent to that of each of the additional flexible structures of the another flexible assembly.

15. The rocket motor assembly of claim 13, wherein at least one of the flexible structures of the flexible assembly has a different shear modulus than at least one of the additional flexible structures of the another flexible assembly.

16. A flexible assembly for a rocket motor assembly, comprising:
    a first substrate;
    a second substrate overlying the first substrate; and
    a lamination comprising an alternating sequence of flexible structures and rigid structures extending between the first substrate and the second substrate, at least one of the flexible structures comprising a substantially homogeneous, cured polysiloxane composition comprising crosslinked polysiloxane chains of at least two different silicone materials.

* * * * *

UNITED STATES PATENT AND TRADEMARK OFFICE
CERTIFICATE OF CORRECTION

PATENT NO. : 10,072,613 B2  
APPLICATION NO. : 14/629297  
DATED : September 11, 2018  
INVENTOR(S) : Himansu M. Gajiwala and Steven B. Hall It is certified that error appears in the above-identified patent and that said Letters Patent is hereby corrected as shown below:

In the Specification

Column 4, Line 13, change "teams that do not" to --terms that do not--

Signed and Sealed this
Eleventh Day of December, 2018

Andrei Iancu
*Director of the United States Patent and Trademark Office*